(12) United States Patent
Kikuchi et al.

(10) Patent No.: US 12,431,289 B2
(45) Date of Patent: Sep. 30, 2025

(54) DIELECTRIC, CAPACITOR, ELECTRICAL CIRCUIT, CIRCUIT BOARD, AND APPARATUS

(71) Applicant: Panasonic Intellectual Property Management Co., Ltd., Osaka (JP)

(72) Inventors: Ryosuke Kikuchi, Osaka (JP); Hisanori Mashiko, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 112 days.

(21) Appl. No.: 18/487,722

(22) Filed: Oct. 16, 2023

(65) Prior Publication Data

US 2024/0047137 A1    Feb. 8, 2024

Related U.S. Application Data

(63) Continuation of application No. PCT/JP2022/012253, filed on Mar. 17, 2022.

(30) Foreign Application Priority Data

Apr. 28, 2021    (JP) .................................. 2021-076879

(51) Int. Cl.
   *H01G 4/12*       (2006.01)
   *H01G 4/30*       (2006.01)
   *H01G 9/032*      (2006.01)

(52) U.S. Cl.
   CPC ........... *H01G 4/1254* (2013.01); *H01G 4/306* (2013.01); *H01G 9/032* (2013.01)

(58) Field of Classification Search
   None
   See application file for complete search history.

(56) References Cited

U.S. PATENT DOCUMENTS

| 9,287,055 | B2* | 3/2016 | Kato | H01G 9/07 |
| 2004/0061990 | A1* | 4/2004 | Dougherty | H10B 53/00 |
| | | | | 257/E27.048 |
| 2007/0094871 | A1* | 5/2007 | Moon | H01G 4/10 |
| | | | | 29/25.42 |
| 2024/0047137 | A1* | 2/2024 | Kikuchi | H01G 9/07 |

FOREIGN PATENT DOCUMENTS

| JP | H09-129507 A | 5/1997 |
| JP | H11-163273 A | 6/1999 |
| JP | 2003-272958 A | 9/2003 |
| JP | 2006-500785 A | 1/2006 |

(Continued)

OTHER PUBLICATIONS

International Search Report issued on Jun. 7, 2022 in International Patent Application No. PCT/JP2022/012253, with English translation.

*Primary Examiner* — Dion R. Ferguson
(74) *Attorney, Agent, or Firm* — Rimon P.C.

(57) ABSTRACT

A dielectric of the present disclosure includes a composite oxide including at least two selected from the group consisting of Nb, Bi, and Ta, wherein the following requirement (I), (II), or (III) is satisfied: (I) the composite oxide includes Nb, Bi, and Ta; (II) the composite oxide includes Nb and Bi and is amorphous; and (III) the composite oxide includes Bi and Ta and is amorphous.

13 Claims, 8 Drawing Sheets

(56) References Cited

FOREIGN PATENT DOCUMENTS

| | | | |
|---|---|---|---|
| JP | 2007-129232 A | | 5/2007 |
| KR | 20100052918 A | * | 5/2010 |
| KR | 101025523 B1 | * | 4/2011 |
| WO | 2004/030100 A1 | | 4/2004 |
| WO | WO-2019188435 A1 | * | 10/2019 ........... C04B 35/453 |

* cited by examiner

DIELECTRIC, CAPACITOR, ELECTRICAL CIRCUIT, CIRCUIT BOARD, AND APPARATUS

This application is a continuation of PCT/JP2022/012253 filed on Mar. 17, 2022, which claims foreign priority of Japanese Patent Application No. 2021-076879 filed on Apr. 28, 2021, the entire contents of both of which are incorporated herein by reference.

BACKGROUND OF THE INVENTION

1. Field of the Invention

The present invention relates to a dielectric, a capacitor, an electrical circuit, a circuit board, and an apparatus.

2. Description of Related Art

Capacitors including a metal such as tantalum or niobium as a valve metal have been known.

For example, JP 2003-272958 A describes an electrode member for solid electrolytic capacitors, the electrode member including a valve metallic foil being a niobium foil and an electrode layer provided on the valve metallic foil. The electrode layer includes a valve metal having a melting point higher than that of the valve metallic foil or a powder of an alloy of the valve metal. Examples of the valve metal include tantalum, and examples of the alloy of the valve metal include a niobium-including alloy and an alloy of tantalum and niobium. JP 2003-272958 A also describes a solid electrolytic capacitor in which a dielectric anodic film layer, a solid electrolyte layer, and a cathode layer are stacked in this order on the electrode layer of the above electrode member for solid electrolytic capacitors.

The electrode layer, which has a sheet shape, is formed by applying a paste including the valve metal or the powder of the alloy of the valve metal onto a surface of an anode body formed of the valve metallic foil and then sintering the paste in a vacuum atmosphere. Furthermore, the dielectric anodic film layer is formed on a surface of the electrode layer by anodic oxidation in a phosphoric acid solution.

SUMMARY OF THE INVENTION

The techniques described in JP 2003-272958 A leave room for reexamination from the viewpoint of maintaining the dielectric loss of a capacitor low and increasing the capacitance thereof. Therefore, the present disclosure provides a dielectric advantageous in maintaining the dielectric loss of a capacitor low and increasing the capacitance thereof.

The present disclosure provides a dielectric including a composite oxide including at least two selected from the group consisting of Nb, Bi, and Ta, wherein
the following requirement (I), (II), or (III) is satisfied:
 (I) the composite oxide includes Nb, Bi, and Ta;
 (II) the composite oxide includes Nb and Bi and is amorphous; and
 (III) the composite oxide includes Bi and Ta and is amorphous.

The present disclosure provides a dielectric advantageous in maintaining the dielectric loss of a capacitor low and increasing the capacitance thereof.

DETAILED DESCRIPTION (Findings on which the Present Disclosure is Based)

As recent electronic devices have smaller sizes and better functions, size reduction, increase in integration density, and increase in clock frequency of electronic circuits are proceeding. For the same reason, size reduction and a performance increase of electronic components included in electronic circuits are also required. It is thought, for example, that offering a small high-capacitance and low-impedance capacitor can contribute to size reduction and a performance increase of electronic components. Aluminum electrolytic capacitors and tantalum electrolytic capacitors are known as capacitors having a high capacitance per volume. An aluminum electrolytic capacitor includes an anode body including a valve metal, the anode body having an aluminum foil surface made rough by etching, the aluminum foil surface having aluminum oxide formed by anodic oxidation. A tantalum electrolytic capacitor includes, for example, as an anode body, a porous body formed by compression molding and sintering a tantalum powder with a tantalum wire inserted therein.

Such anode body manufacturing methods are thought to have limitations in size reduction and thickness reduction of porous bodies and also size reduction of capacitors. It is also conceivable that, as in the technique described in JP 2003-272958 A, a paste including a valve metal such as tantalum and niobium or a powder of an alloy including the valve metal is applied onto a surface of a valve metallic foil such as a tantalum foil or a niobium foil and then sintered. It is thought that an electrode body in which a porous layer made of the valve metal is provided on the surface of the valve metallic foil can be obtained thereby. It is thought that such an electrode body can contribute to size reduction and a capacity increase of capacitors. JP 2003-272958 A, however, fails to describe an attempt to increase the performance of a capacitor by means of properties of a dielectric.

In view of these circumstances, the present inventors made intensive studies to create a new dielectric having properties advantageous in maintaining the dielectric loss of a capacitor low and increasing the capacitance thereof. Through a lot of trial and error, the present inventors have gained a new finding on a relation between whether and how much Nb, Bi, and Ta are included in a composite oxide and properties of a dielectric including the composite oxide. On the basis of this new finding, the present inventors have consequently invented a dielectric and a capacitor of the present disclosure.

Summary of One Aspect According to the Present Disclosure

A dielectric according to a first aspect of the present disclosure includes a composite oxide including at least two selected from the group consisting of Nb, Bi, and Ta, and the following requirement (I), (II), or (III) is satisfied:
(I) the composite oxide includes Nb, Bi, and Ta;
(II) the composite oxide includes Nb and Bi and is amorphous; and
(III) the composite oxide includes Bi and Ta and is amorphous.

The dielectric according to the first aspect is likely to have a high dielectric constant and a low dielectric loss tangent and is advantageous in maintaining the dielectric loss of a capacitor low and increasing the capacitance thereof.

According to a second aspect of the present disclosure, for example, in the dielectric according to the first aspect, the composite oxide may have composition $Nb_xBi_yTa_{(1-x-y)}O_k$. In the composition, k may be a value for maintaining electroneutrality of the composite oxide, and the composition may satisfy the following requirement (i) or (ii):
(i) $x \geq 0.70$ and $0 < y \leq 0.3$; and
(ii) $x < 0.70$, $0.10 \leq y \leq 0.90$, and $0 < x+y \leq 1$ According to the second aspect, the dielectric is likely to have a high dielectric constant and a low dielectric loss tangent more reliably.

According to a third aspect of the present disclosure, for example, the dielectric according to the first or second aspect may be amorphous. According to the third aspect, the dielectric is likely to have a high dielectric constant and a low dielectric loss tangent more reliably.

According to a fourth aspect of the present disclosure, for example, the dielectric according to the first or second aspect may include a sputtered film. According to the fourth aspect, for example, a dielectric film for capacitors can be formed by sputtering.

According to a fifth aspect of the present disclosure, for example, the dielectric according to any one of the first to fourth aspects may be for a capacitor. According to the fifth aspect, the dielectric can be included in capacitors.

A capacitor according to a sixth aspect of the present disclosure includes:
 a first electrode;
 a second electrode; and
 the dielectric disposed between the first electrode and the second electrode, wherein
 the dielectric is the dielectric according to the first to fifth aspects.

According to the sixth aspect, the dielectric is likely to have a high dielectric constant and a low dielectric loss tangent. Consequently, the capacitance of the capacitor is likely to be increased and the dielectric loss of the capacitor is likely to be maintained low.

According to a seventh aspect of the present disclosure, for example, in the capacitor according to the sixth aspect, at least a portion of the first electrode may be a porous portion. According to the seventh aspect, the surface area of the first electrode is likely to be large, and the capacitance of the capacitor is likely to be increased more.

According to an eighth aspect of the present disclosure, for example, in the capacitor according to the sixth or seventh aspect, the first electrode may include a valve metal.

According to the eighth aspect, a member including a valve metal can be used as the first electrode.

According to a ninth aspect of the present disclosure, for example, in the capacitor according to the eighth aspect, the valve metal may be at least one selected from the group consisting of Ta, Nb, and Bi. According to the eighth aspect, a member including at least one selected from the group consisting of Ta, Nb, and Bi can be used as the first electrode.

According to a tenth aspect of the present disclosure, in the capacitor according to any one of the sixth to ninth aspects, the second electrode may include at least one selected from the group consisting of Al, Ta, Nb, Bi, gold, silver, platinum, and nickel. According to the tenth aspect, a member including any of the above metals can be used as the second electrode.

According to an eleventh aspect of the present disclosure, the capacitor according to the seventh aspect may further include an electrolyte in contact with the second electrode. Additionally, the electrolyte may fill the porous portion and may include at least one selected from the group consisting of an electrolyte solution, an electrically conductive polymer, and manganese oxide. According to the eleventh aspect, a capacitor including an electrolyte such as an electrolyte solution can be provided.

An electrical circuit according to a twelfth aspect of the present disclosure includes the capacitor according to any one of the sixth to eleventh aspects. According to the twelfth aspect, the capacitor is likely to have a low dielectric loss and a high capacitance, and thus the electrical circuit is likely to have improved properties.

A circuit board according to a thirteenth aspect of the present disclosure includes the capacitor according to any one of the sixth to eleventh aspects. According to the thirteenth aspect, the capacitor is likely to have a low dielectric loss and a high capacitance, and thus the circuit board is likely to have improved properties.

An apparatus according to a fourteenth aspect of the present disclosure includes the capacitor according to any one of the sixth to eleventh aspects. According to the fourteenth aspect, the capacitor is likely to have a low dielectric loss and a high capacitance, and thus the apparatus is likely to have improved properties.

EMBODIMENTS

Embodiments of the present disclosure will be described hereinafter with reference to the drawings. The present disclosure is not limited to the following embodiments.

Figure 1:
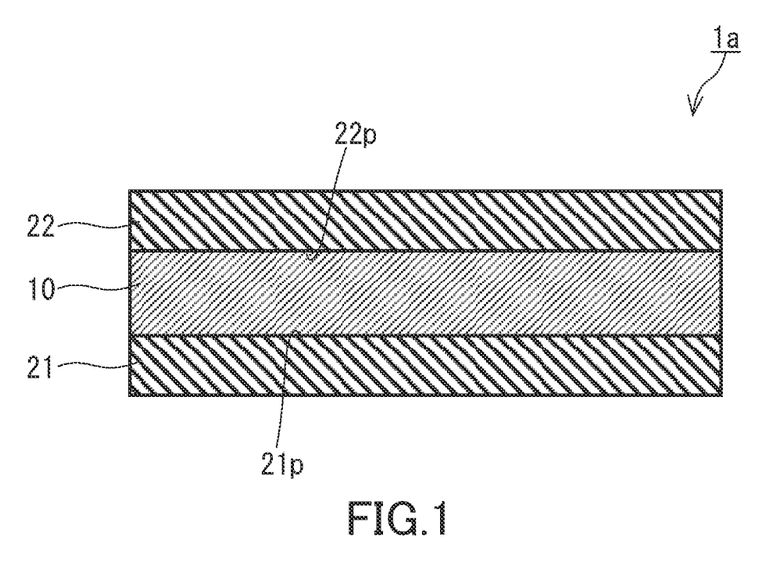
FIG. 1 is a cross-sectional view of a capacitor according to an embodiment of the present disclosure.

FIG. 1 is a cross-sectional view of a capacitor 1a according to an example of an embodiment of the present disclosure. As shown in FIG. 1, the capacitor 1a includes a dielectric 10. In other words, the dielectric 10 is a material for a capacitor. The dielectric 10 includes a composite oxide including at least two selected from the group consisting of Nb, Bi, and Ta. Moreover, the composite oxide satisfies the following requirement (I), (II), or (III). The composite oxide may include, as metal atoms, only Nb and Bi, only Bi and Ta, or all of Nb, Bi, and Ta. The dielectric 10 including such a composite oxide is likely to have a high dielectric constant and a low dielectric loss tangent. Consequently, the capacitor 1a is likely to exhibit a high capacitance and maintain a dielectric loss low.
(I) The composite oxide includes Nb, Bi, and Ta.
(II) The composite oxide includes Nb and Bi and is amorphous.

(III) The composite oxide includes Bi and Ta and is amorphous.

The composite oxide included in the dielectric 10 is, for example, a solid solution of at least two selected from the group consisting of niobium oxide, bismuth oxide, and tantalum oxide, and satisfies the above requirement (I), (II), or (III).

The composite oxide included in the dielectric 10 has, for example, composition represented by $Nb_xBi_yTa_{(1-x-y)}O_k$. This composition satisfies the following requirement (i) or (ii). Moreover, in this composition, k is a value for maintaining electroneutrality of the composite oxide. Since the composite oxide has such composition, the dielectric 10 is likely to have a high dielectric constant and a low dielectric loss tangent more reliably. Consequently, the capacitor 1a is likely to exhibit a high capacitance and maintain a dielectric loss low more reliably.

(i) $x \geq 0.70$ and $0 < y \leq 0.3$
(ii) $x < 0.70$, $0.10 \leq y \leq 0.90$, and $0 < x+y \leq 1$ When the composition of the composite oxide satisfies the requirement (i), y is desirably 0.01 or more, more desirably 0.02 or more, even more desirably 0.09 or more, particularly desirably 0.12 or more, especially desirably 0.15 or more.

When the composition of the composite oxide satisfies the requirement (ii), x may be 0.65 or less, 0.60 or less, 0.55 or less, or 0.50 or less. The value x may be 0.001 or more, 0.005 or more, 0.01 or more, or 0.02 or more. When x is 0.078 or less, the composite oxide can be considered to be substantially free of Nb.

When the composition of the composite oxide satisfies the requirement (ii), y may be 0.15 or more, 0.20 or more, 0.25 or more, or 0.30 or more. The value y may be 0.85 or less, 0.80 or less, 0.75 or less, or 0.70 or less.

The value x+y may be 0.05 or more, 0.10 or more, 0.15 or more, or 0.20 or more. The value x+y may be 0.95 or less, 0.90 or less, 0.85 or less, or 0.80 or less. When the value x+y is 0.097 or more, the composite oxide can be considered to be substantially free of Ta.

The dielectric constant of the dielectric 10 is not limited to a particular value. The dielectric constant of the dielectric 10 is, for example, higher than that of $Ta_2O_5$. The dielectric constant of the dielectric 10 at 10 kHz is, for example, 28.0 or more, desirably 30.0 or more, more desirably 32.0 or more, even more desirably 35.0 or more, particularly desirably 38.0 or more. The dielectric constant of the dielectric 10 at 1 MHz is, for example, 28.0 or more, desirably 30.0 or more, more desirably 32.0 or more, even more desirably 35.0 or more, particularly desirably 38.0 or more.

The dielectric loss tangent of the dielectric 10 is not limited to a particular value. The dielectric loss tangents of the dielectric 10 at 10 kHz and 1 MHz are each, for example, 0.1 or less, desirably 0.05 or less, more desirably 0.03 or less, even more desirably 0.02 or less.

The dielectric 10 is, for example, amorphous. This makes occurrence of a leak current in the dielectric 10 less likely. The reason is presumably because occurrence of a leak current attributable to a grain boundary can be reduced in the dielectric 10. As a result, the dielectric 10 is likely to have a high dielectric constant and a low dielectric loss tangent more reliably. For example, when a peak whose full width at half maximum is 5° or less and which is distinct from a background is not confirmed in an XRD pattern of the dielectric 10 at diffraction angles of 10° to 50°, the compound included in the dielectric 10 is concluded to be amorphous.

As shown in FIG. 1, the dielectric 10 of the capacitor 1a is formed, for example, as a film. The dielectric 10 includes, for example, a sputtered film. In this case, the dielectric 10 is likely to have a high dielectric constant and a low dielectric loss tangent more reliably. Additionally, in this case, a composition ratio between the metal atoms in the composite oxide is easily controlled to be a desired value. The dielectric 10 may be an anodic film or another thin film. The method for forming the other thin film is, for example, vacuum deposition, pulsed laser deposition (PLD), atomic layer deposition (ALD), and chemical vapor deposition (CVD).

As shown in FIG. 1, the capacitor 1a further includes a first electrode 21 and a second electrode 22. The dielectric 10 is disposed between the first electrode 21 and the second electrode 22. The second electrode 22 covers at least a portion of the dielectric 10.

The materials of the first electrode 21 and the second electrode 22 are not limited to particular materials. The first electrode 21 and the second electrode 22 include, for example, a metal. The first electrode 21 includes, for example, a valve metal. Examples of the valve metal include Al, Ta, Nb, and Bi. The first electrode 21 includes, for example, at least one selected from the group consisting of Ta, Nb, and Bi as the valve metal. The first electrode 21 may include a noble metal such as gold or platinum, or may include nickel.

The second electrode 22 may include, for example, a valve metal such as Al, Ta, Nb, or Bi, may include a noble metal such as gold, silver, or platinum, or may include nickel. The second electrode 22 includes, for example, at least one selected from the group consisting of Al, Ta, Nb, Bi, gold, silver, platinum, and nickel.

As shown in FIG. 1, the first electrode 21 has a principal surface 21p. One principal surface of the dielectric 10 is, for example, in contact with the principal surface 21p. The second electrode 22 has a principal surface 22p parallel to the principal surface 21p. The other principal surface of the dielectric 10 is, for example, in contact with the principal surface 22p.

Figure 2A:
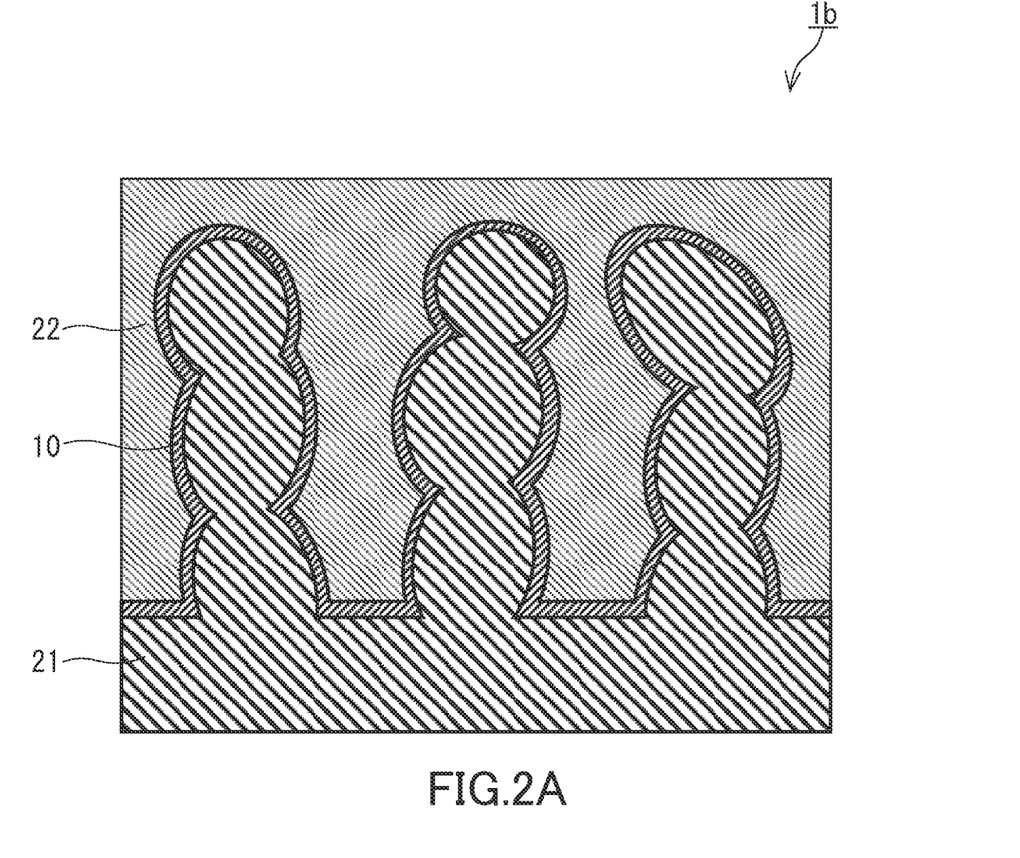
FIG. 2A is a cross-sectional view of a capacitor according to another embodiment of the present disclosure.

FIG. 2A is a cross-sectional view showing a capacitor 1b according to another example of the embodiment of the present disclosure. The capacitor 1b is configured in the same manner as the capacitor 1a unless otherwise described. The components of the capacitor 1b that are the same as or correspond to the components of the capacitor 1a are denoted by the same reference characters, and detailed descriptions of such components are omitted. The description given for the capacitor 1a is applicable to the capacitor 1b unless there is a technical inconsistency.

As shown in FIG. 2A, at least a portion of the first electrode 21 is a porous portion in the capacitor 1b. This structural feature is likely to increase the surface area of the first electrode 21 and the capacitance of the capacitor. The porous structure can be formed, for example, by etching of a metallic foil, sintering of powder, or the like.

As shown in FIG. 2A, for example, the film of the dielectric 10 is arranged on a surface of the porous portion of the first electrode 21. In this case, anodization or ALD can be adopted as the method for forming the film of the dielectric 10.

In the capacitor 1b, the second electrode 22 is disposed, for example, to fill a space around the porous portion of the first electrode 21.

Figure 2B:
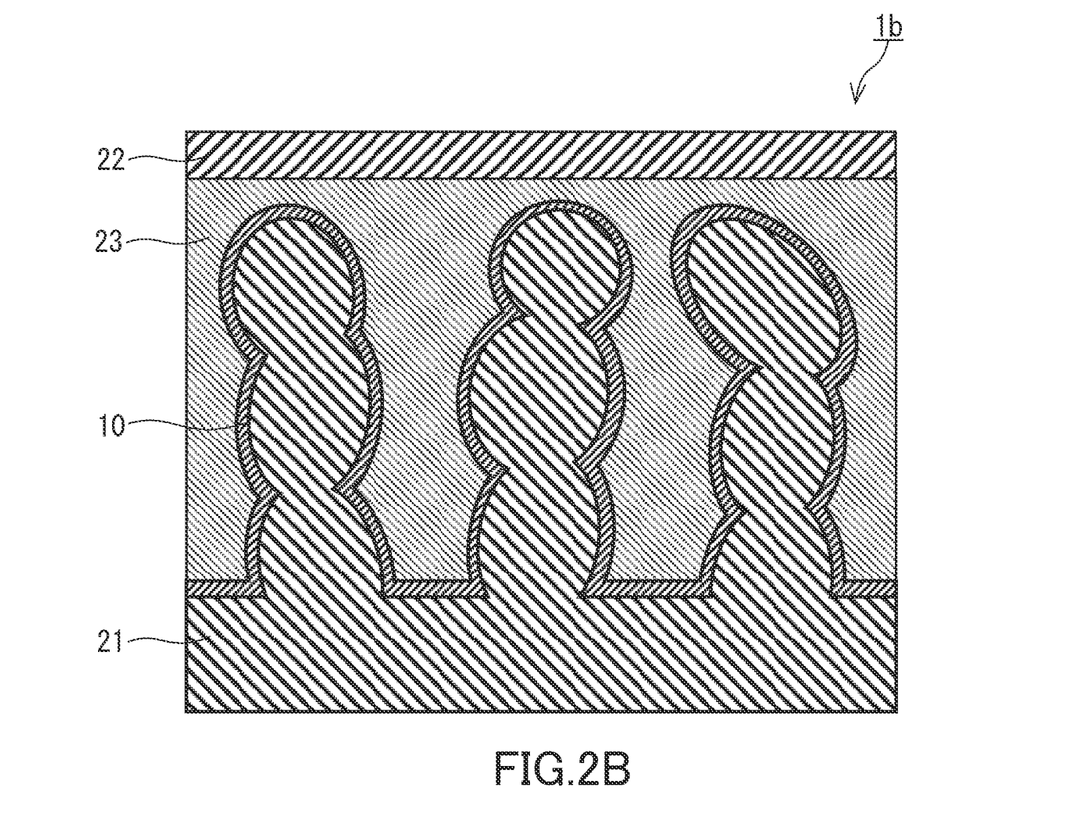
FIG. 2B is a cross-sectional view of a variant of the capacitor shown in FIG. 2A.

The capacitors 1a and 1b may be electrolytic capacitors. In this case, for example, an electrolyte 23 is disposed between the first electrode 21 and the second electrode 22. The electrolyte 23 may be disposed between the dielectric 10 and the second electrode 22. FIG. 2B shows a variant of the capacitor 1b configured as an electrolytic capacitor. In the capacitor 1b, the electrolyte 23 is disposed, for example, to fill the space around the porous portion of the first electrode 21.

The electrolyte includes, for example, at least one selected from the group consisting of an electrolyte solution and an electrically conductive polymer. Examples of the electrically conductive polymer include polypyrrole, polythiophene, polyaniline, and derivatives of these. The electrolyte may be made of a manganese compound such as manganese oxide. The electrolyte may include a solid electrolyte.

The electrolyte including the electrically conductive polymer can be formed by performing chemical polymerization, electrolytic polymerization, or both chemical polymerization and electrolytic polymerization of a monomer as a raw material on the dielectric 10. The electrolyte including the electrically conductive polymer may be formed by adhering a solution or dispersion of the electrically conductive polymer onto the dielectric 10.

Figure 3A:
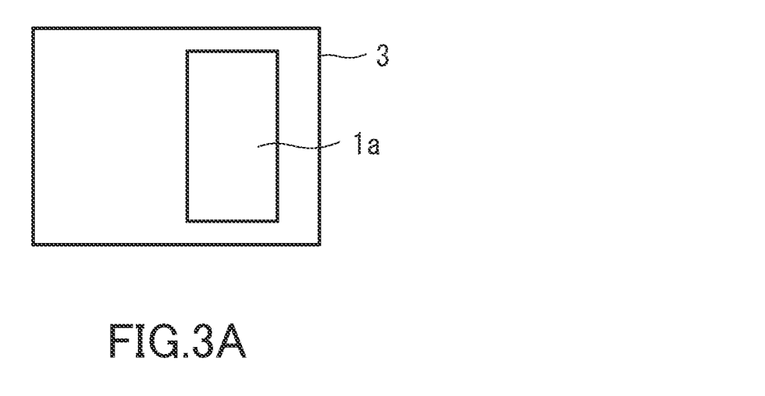
FIG. 3A schematically shows an electrical circuit according to an embodiment of the present disclosure.

FIG. 3A schematically shows an electrical circuit 3 according to the embodiment of the present disclosure. As shown in FIG. 3A, the electrical circuit 3 includes the capacitor 1a. The electrical circuit 3 is not limited to a particular circuit as long as the electrical circuit 3 includes the capacitor 1a. The electrical circuit 3 may be an active circuit or a passive circuit. The electrical circuit 3 may be a discharging circuit, a smoothing circuit, a decoupling circuit, or a coupling circuit. Since the electrical circuit 3 includes the capacitor 1a, the electrical circuit 3 is likely to have desired properties. For example, it is likely that the capacitor 1a reduces noise in the electrical circuit 3. The electrical circuit 3 may include the capacitor 1b instead of the capacitor 1a.

Figure 3B:
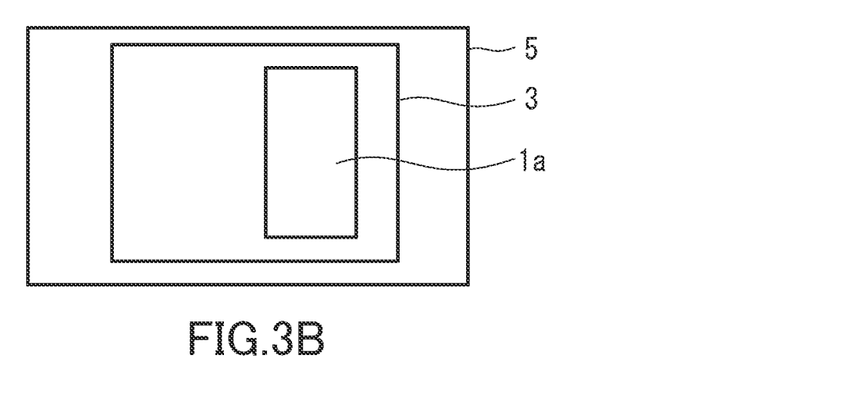
FIG. 3B schematically shows a circuit board according to an embodiment of the present disclosure.

FIG. 3B schematically shows a circuit board 5 according to the embodiment of the present disclosure. As shown in FIG. 3B, the circuit board 5 includes the capacitor 1a. The circuit board 5 is not limited to a particular circuit board as long as the circuit board 5 includes the capacitor 1a. The circuit board 5 includes, for example, the electrical circuit 3. The circuit board 5 may be an embedded board or a motherboard. The circuit board 5 may include the capacitor 1b instead of the capacitor 1a.

Figure 3C:
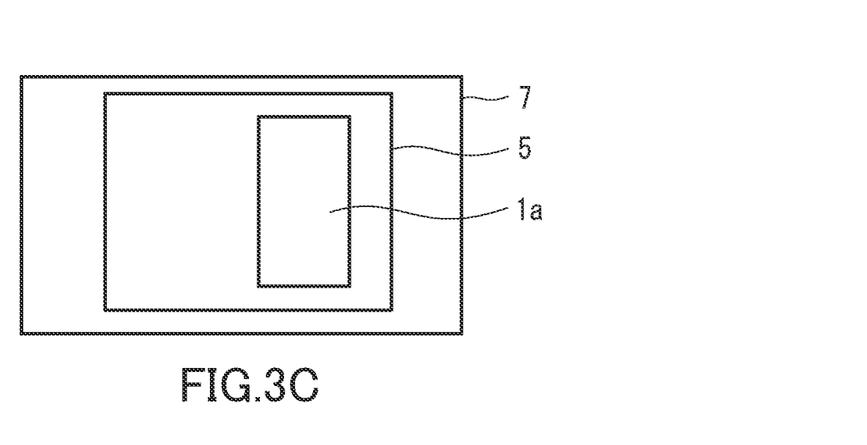
FIG. 3C schematically shows an apparatus according to an embodiment of the present disclosure.

FIG. 3C schematically shows an apparatus 7 according to the embodiment of the present disclosure. As shown in FIG. 3C, the apparatus 7 includes the capacitor 1a. The apparatus 7 is not limited to a particular apparatus as long as the apparatus 7 includes the capacitor 1a. The apparatus 7 includes, for example, the circuit board 5. The apparatus 7 may be an electronic device, a communication device, a signal-processing device, or a power-supply device. The apparatus 7 may be a server, an AC adapter, an accelerator, or a flat-panel display such as a liquid crystal display (LCD). The apparatus 7 may be a USB charger, a solid-state drive (SSD), an information terminal such as a PC, a smartphone, or a tablet PC, or an Ethernet switch.

EXAMPLES

Hereinafter, the present disclosure will be described in more detail with reference to examples. The examples given below are just examples, and the present disclosure is not limited to them.
(Production of Sample)

Sputtering was performed using Ti and Pt as targets to form a lower electrode being a laminate of a thin Ti film and a thin Pt film on a substrate. The thin Ti film was in contact with the substrate. The substrate used was an alkali-free glass EAGLE XG manufactured by Corning Incorporated. During the sputtering, an environment of the substrate was maintained at a pressure of 0.3 Pa, and an argon gas occupied the entire volume of the environment. Additionally, the temperature of the substrate was adjusted at 600° C.

Next, a dielectric film of each sample was formed on the lower electrode by co-sputtering using $Nb_2O_5$, $Bi_2O_3$, and $Ta_2O_5$ as targets. Co-sputtering conditions were adjusted so that the dielectric film would have a thickness of 100 nm. During the co-sputtering, an environment of the substrate was maintained at a pressure of 0.3 Pa, and an argon gas occupied the entire volume of the environment. Additionally, the substrate was not heated. A composition ratio between Nb, Bi, and Ta in each sample was controlled by a film formation time adjusted by opening and closing a shutter. Dielectric films according to Samples 1 to 66 were obtained in this manner. Next, sputtering was performed using Pt as a target to form an upper electrode made of Pt and having a diameter of 104 μm and a thickness of 100 nm on each dielectric film. Samples 1 to 66 were obtained in this manner.
(Identification of Composition)

Before the formation of the upper electrode, the dielectric film according to each sample was subjected to fluorescent X-ray analysis using a fluorescent X-ray analyzer micro EDX-1400 manufactured by Shimadzu Corporation, and quantitative analysis of elements in the dielectric film was performed. The fundamental parameter method (FP method) was adopted as the quantitative analysis method. Ratios between the numbers of Nb, Bi, and Ta atoms in the dielectric film according to each sample were determined from the results of the quantitative analysis. Tables 1 and 2 show the results. It is understood that the composite oxides included in the dielectric films according to Samples 1 to 65 are each a solid solution of at least two selected from the group consisting of niobium oxide, bismuth oxide, and tantalum oxide.
(Confirmation for Crystal Phase)

Figure 4:
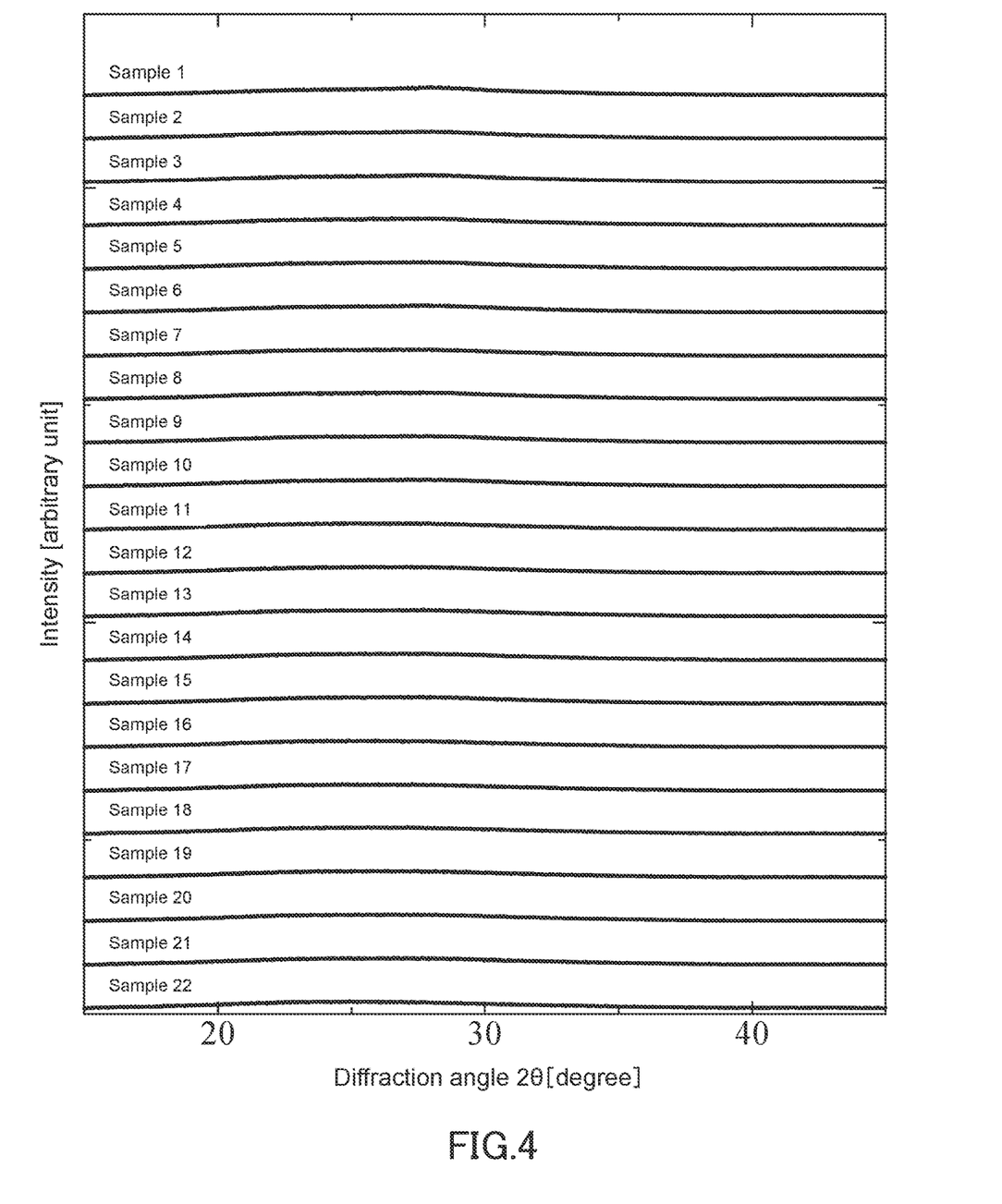
FIG. 4 shows X-ray diffraction (XRD) patterns of dielectric films of Samples 1 to 22.
Figure 5:
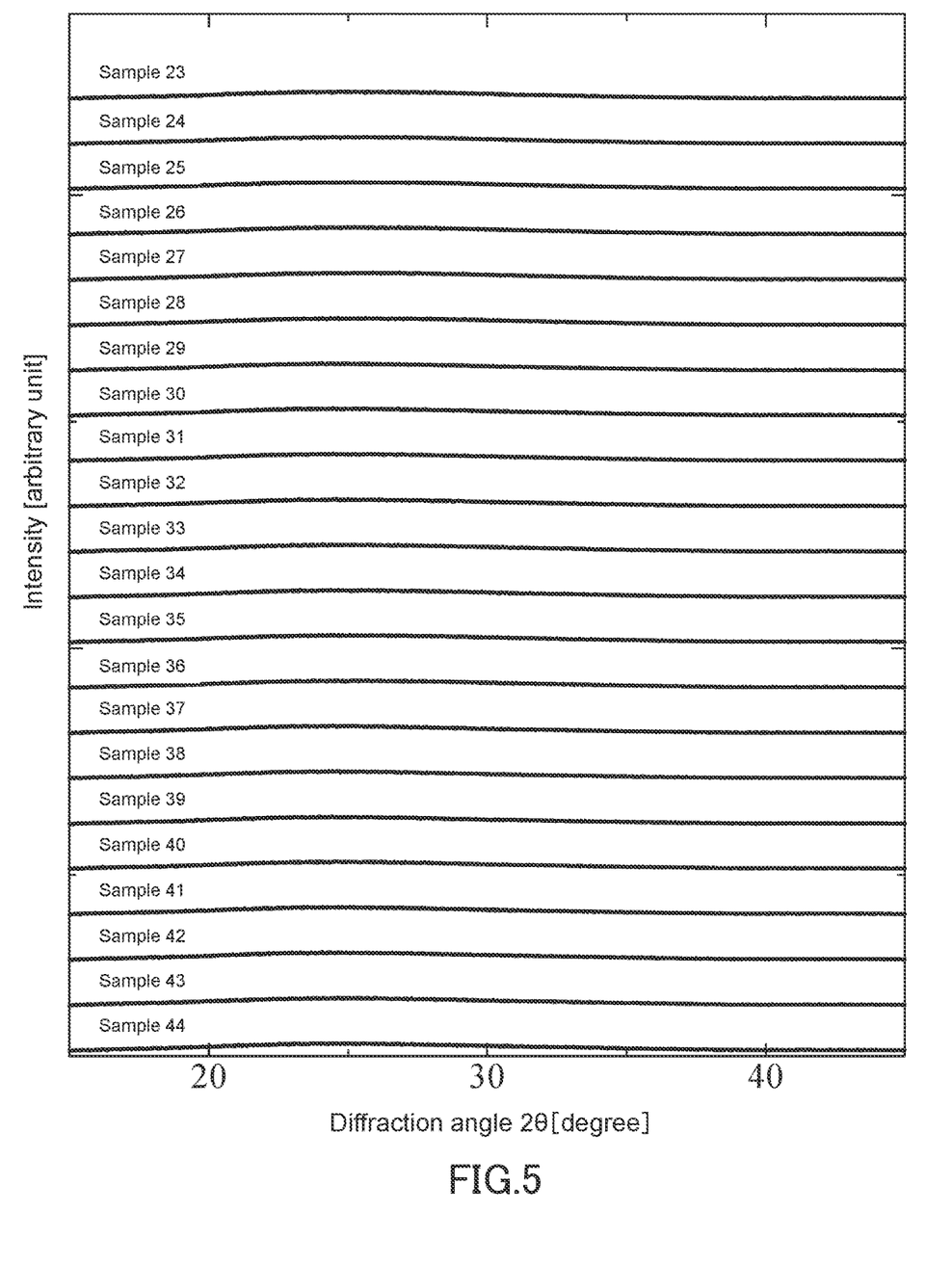
FIG. 5 shows XRD patterns of dielectric films of Samples 23 to 44.
Figure 6:
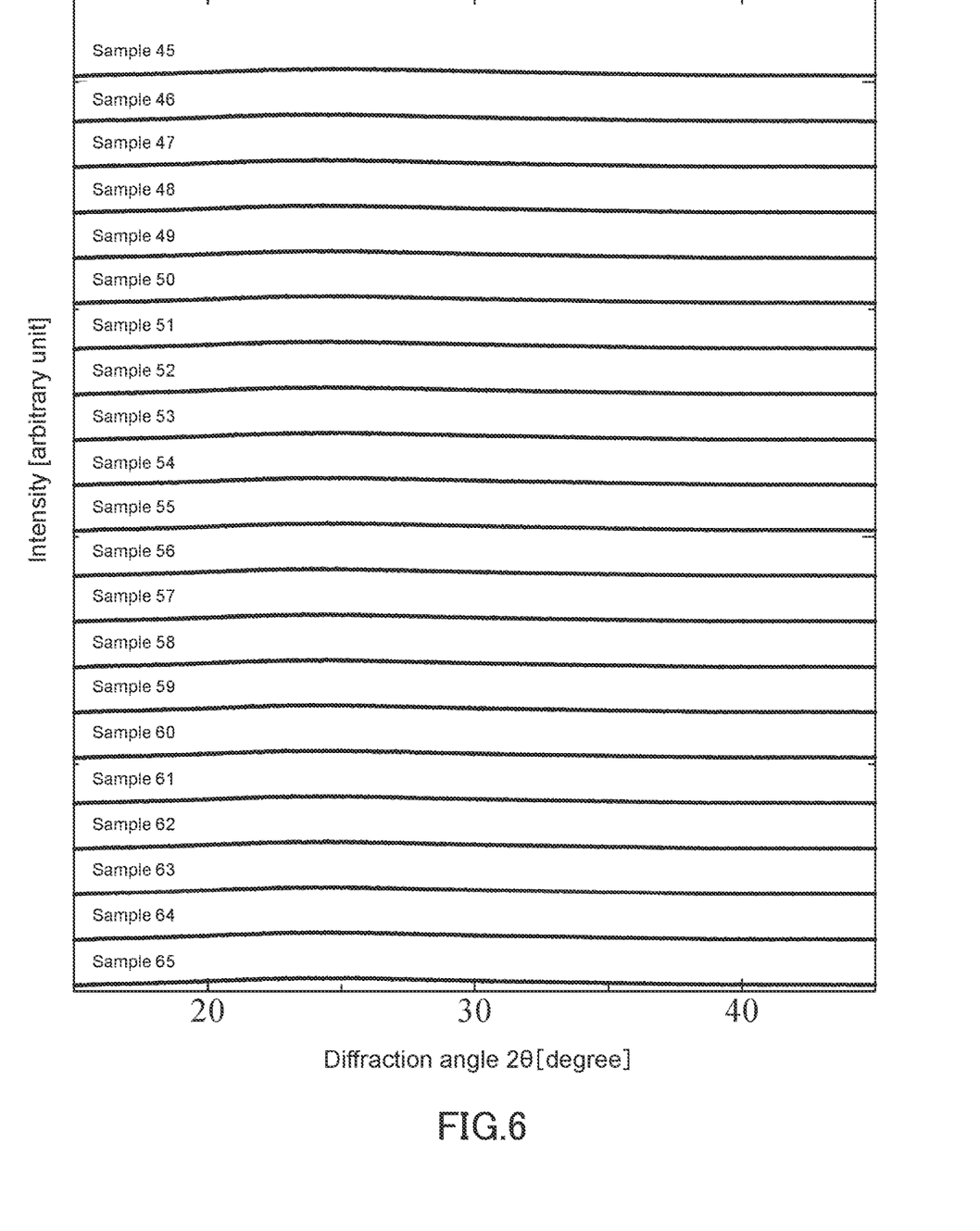
FIG. 6 shows XRD patterns of dielectric films of Samples 45 to 65.
Figure 7:
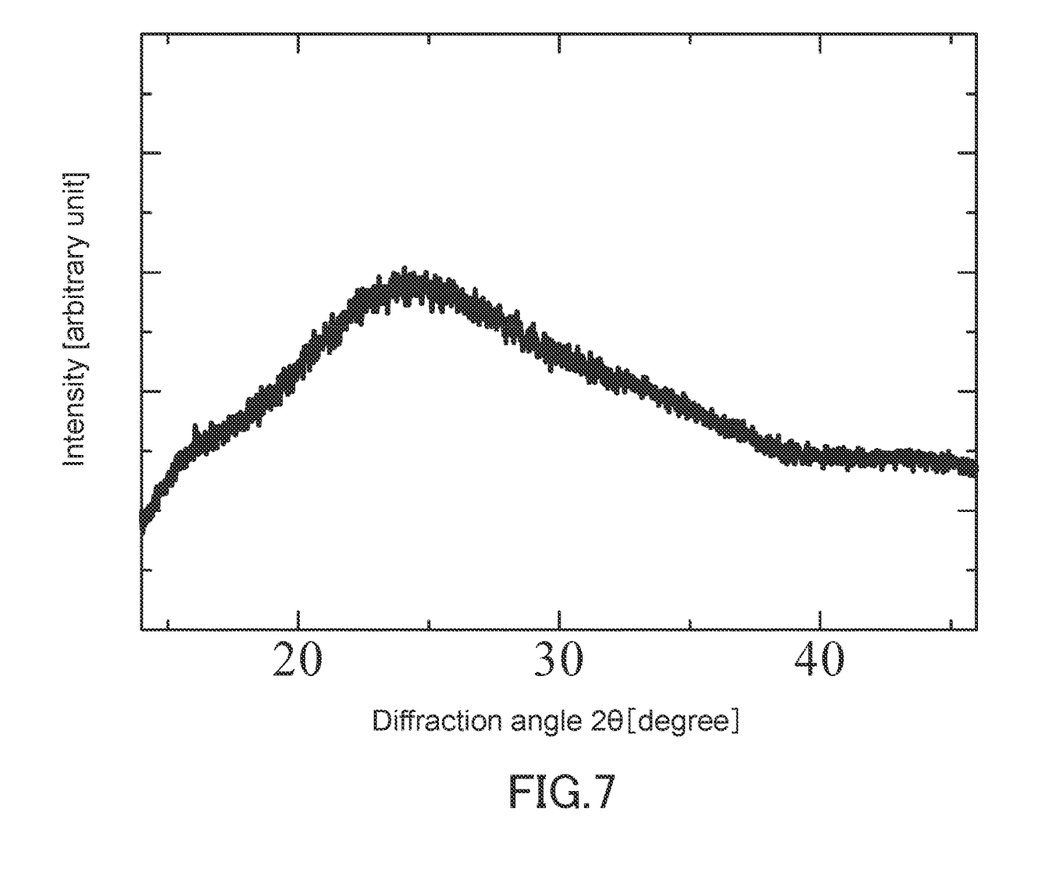
FIG. 7 shows an XRD pattern of a dielectric film of Sample 66.

Before the formation of the upper electrode, the dielectric film according to each sample was subjected to X-ray diffraction measurement using an X-ray diffractometer D8 Discover manufactured by Bruker Corporation to obtain an XRD pattern of each dielectric film by 2θ/θ scan. FIG. 4 shows XRD patterns of the dielectric films of Samples 1 to 22. FIG. 5 shows XRD patterns of the dielectric films of Samples 23 to 44. FIG. 6 shows XRD patterns of the dielectric films of Samples 45 to 65. FIG. 7 shows an XRD pattern of the dielectric film according to Sample 66. In FIGS. 4 to 7, the vertical axis represents a diffraction intensity in arbitrary unit, while the horizontal axis represents a diffraction angle. In FIGS. 4 to 6, there are tick marks between the XRD patterns adjacent along the vertical axis, the tick marks indicating that the diffraction intensity is 0 at the marks. In the measurement, a Cu-Kα ray was used as an X-ray source, and the voltage and the current were adjusted at 50 kV and 100 mA, respectively. The measurement was performed using a two-dimensional detector, and conversion into 2θ was performed.
(Dielectric Properties)

A dielectric constant ε and a dielectric loss tangent tan δ of the dielectric film of each sample were measured at 10 kHz and 1 MHz using an LCR meter. After measuring a capacitance of each sample, the dielectric constant was determined on the basis of the measurement value of the capacitance, the thickness of the dielectric film, and the areas of the electrodes. An ambient temperature was 25° C. in the measurement. Tables 1 and 2 show the results.

As shown in Tables 1 and 2, the dielectric constants of the dielectric films according to Samples 1 to 65 at frequencies of 10 kHz and 1 MHz are more than 28.0. Furthermore, the dielectric loss tangents of the dielectric films according to Samples 1 to 65 at frequencies of 10 kHz and 1 MHz are very low, namely, 0.05 or less. On the other hand, the dielectric loss tangents of the dielectric film according to Sample 66 at frequencies of 10 kHz and 1 MHz are very low, namely, 0.05 or less. However, the dielectric constants of the dielectric film according to Sample 66 at frequencies of 10 kHz and 1 MHz are less than 28.0. These indicate that a dielectric including a composite oxide including at least two selected from the group consisting of Nb, Bi, and Ta satisfies both a high dielectric constant and a low dielectric loss tangent.

From the fact that a peak whose full width at half maximum is 5° or less and which is distinct from a background is not confirmed in the XRD patterns of the dielectric films of Samples 1 to 65 shown in FIGS. 4, 5, and 6, it can be concluded that the compound included in each dielectric film is amorphous. It is indicated that a dielectric including the above-described composite oxide has a high dielectric constant and a low dielectric loss tangent because the dielectric is amorphous.

The dielectric film of Sample 66 is formed of $Ta_2O_5$ alone. From the fact that a peak whose full width at half maximum is 5° or less and which is distinct from a background is not confirmed in the XRD pattern of the dielectric film of Sample 66 shown in FIG. 7, it can be concluded that the compound included in the dielectric film is amorphous.

TABLE 1

| | Ratio between numbers of atoms | | | 10 KHz | | 1 MHz | | |
|---|---|---|---|---|---|---|---|---|
| | Nb/ (Nb + Bi + Ta) | Bi/ (Nb + Bi + Ta) | Ta/ (Nb + Bi + Ta) | Dielectric constant | Dielectric loss tangent | Dielectric constant | Dielectric loss tangent | Crystal phase |
| Sample 1 | 0.002 | 0.997 | 0.001 | 35.2 | 0.021 | 33.8 | 0.027 | Amorphous |
| Sample 2 | 0.156 | 0.842 | 0.003 | 35.0 | 0.025 | 34.0 | 0.036 | Amorphous |
| Sample 3 | 0.078 | 0.891 | 0.031 | 37.0 | 0.012 | 36.2 | 0.050 | Amorphous |
| Sample 4 | 0.259 | 0.739 | 0.002 | 36.1 | 0.010 | 35.5 | 0.024 | Amorphous |
| Sample 5 | 0.119 | 0.838 | 0.043 | 37.2 | 0.009 | 36.6 | 0.038 | Amorphous |
| Sample 6 | 0.070 | 0.820 | 0.110 | 39.7 | 0.011 | 39.0 | 0.039 | Amorphous |
| Sample 7 | 0.368 | 0.631 | 0.002 | 37.7 | 0.049 | 37.1 | 0.030 | Amorphous |
| Sample 8 | 0.285 | 0.679 | 0.036 | 38.2 | 0.008 | 37.7 | 0.016 | Amorphous |
| Sample 9 | 0.186 | 0.707 | 0.107 | 39.1 | 0.009 | 38.6 | 0.019 | Amorphous |
| Sample 10 | 0.060 | 0.726 | 0.215 | 40.3 | 0.009 | 39.8 | 0.019 | Amorphous |
| Sample 11 | 0.434 | 0.566 | 0.000 | 38.8 | 0.007 | 38.3 | 0.016 | Amorphous |
| Sample 12 | 0.352 | 0.606 | 0.042 | 39.3 | 0.008 | 38.8 | 0.018 | Amorphous |
| Sample 13 | 0.293 | 0.607 | 0.100 | 39.7 | 0.008 | 39.2 | 0.020 | Amorphous |
| Sample 14 | 0.151 | 0.626 | 0.223 | 39.7 | 0.013 | 39.2 | 0.019 | Amorphous |
| Sample 15 | 0.012 | 0.655 | 0.332 | 40.1 | 0.007 | 39.7 | 0.013 | Amorphous |
| Sample 16 | 0.545 | 0.454 | 0.001 | 41.2 | 0.007 | 40.7 | 0.018 | Amorphous |
| Sample 17 | 0.464 | 0.498 | 0.038 | 40.9 | 0.008 | 40.4 | 0.020 | Amorphous |
| Sample 18 | 0.382 | 0.510 | 0.108 | 40.4 | 0.007 | 39.9 | 0.022 | Amorphous |
| Sample 19 | 0.272 | 0.520 | 0.209 | 40.4 | 0.007 | 39.8 | 0.022 | Amorphous |
| Sample 20 | 0.179 | 0.514 | 0.307 | 40.9 | 0.007 | 40.4 | 0.021 | Amorphous |
| Sample 21 | 0.052 | 0.558 | 0.390 | 39.5 | 0.007 | 39.1 | 0.021 | Amorphous |
| Sample 22 | 0.650 | 0.348 | 0.003 | 43.6 | 0.008 | 43.0 | 0.016 | Amorphous |
| Sample 23 | 0.589 | 0.372 | 0.038 | 42.0 | 0.007 | 41.5 | 0.015 | Amorphous |
| Sample 24 | 0.459 | 0.427 | 0.114 | 41.8 | 0.008 | 41.2 | 0.019 | Amorphous |
| Sample 25 | 0.397 | 0.407 | 0.197 | 41.7 | 0.007 | 41.2 | 0.019 | Amorphous |
| Sample 26 | 0.273 | 0.420 | 0.307 | 41.0 | 0.007 | 40.5 | 0.019 | Amorphous |
| Sample 27 | 0.199 | 0.403 | 0.398 | 39.8 | 0.007 | 39.3 | 0.018 | Amorphous |
| Sample 28 | 0.053 | 0.415 | 0.532 | 39.1 | 0.007 | 38.6 | 0.020 | Amorphous |
| Sample 29 | 0.750 | 0.250 | 0.000 | 44.1 | 0.009 | 43.4 | 0.014 | Amorphous |
| Sample 30 | 0.672 | 0.287 | 0.041 | 43.5 | 0.008 | 42.8 | 0.013 | Amorphous |
| Sample 31 | 0.587 | 0.316 | 0.097 | 42.2 | 0.008 | 41.6 | 0.012 | Amorphous |

TABLE 1-continued

| | Ratio between numbers of atoms | | | 10 KHz | | 1 MHz | | |
| --- | --- | --- | --- | --- | --- | --- | --- | --- |
| | Nb/ (Nb + Bi + Ta) | Bi/ (Nb + Bi + Ta) | Ta/ (Nb + Bi + Ta) | Dielectric constant | Dielectric loss tangent | Dielectric constant | Dielectric loss tangent | Crystal phase |
| Sample 32 | 0.506 | 0.302 | 0.192 | 40.9 | 0.008 | 40.4 | 0.012 | Amorphous |
| Sample 33 | 0.404 | 0.298 | 0.297 | 39.5 | 0.008 | 39.0 | 0.013 | Amorphous |

TABLE 2

| | Ratio between numbers of atoms | | | 10 KHz | | 1 MHz | | |
| --- | --- | --- | --- | --- | --- | --- | --- | --- |
| | Nb/ (Nb + Bi + Ta) | Bi/ (Nb + Bi + Ta) | Ta/ (Nb + Bi + Ta) | Dielectric constant | Dielectric loss tangent | Dielectric constant | Dielectric loss tangent | Crystal phase |
| Sample 34 | 0.257 | 0.332 | 0.412 | 39.9 | 0.007 | 39.4 | 0.013 | Amorphous |
| Sample 35 | 0.143 | 0.314 | 0.543 | 39.6 | 0.007 | 39.0 | 0.013 | Amorphous |
| Sample 36 | 0.026 | 0.315 | 0.659 | 38.2 | 0.007 | 37.7 | 0.012 | Amorphous |
| Sample 37 | 0.843 | 0.157 | 0.000 | 42.2 | 0.009 | 41.4 | 0.015 | Amorphous |
| Sample 38 | 0.769 | 0.194 | 0.037 | 41.6 | 0.009 | 40.8 | 0.015 | Amorphous |
| Sample 39 | 0.671 | 0.229 | 0.100 | 40.0 | 0.009 | 39.3 | 0.013 | Amorphous |
| Sample 40 | 0.607 | 0.202 | 0.191 | 39.4 | 0.009 | 38.6 | 0.014 | Amorphous |
| Sample 41 | 0.525 | 0.194 | 0.281 | 38.2 | 0.008 | 37.6 | 0.012 | Amorphous |
| Sample 42 | 0.397 | 0.199 | 0.405 | 37.4 | 0.008 | 36.8 | 0.013 | Amorphous |
| Sample 43 | 0.272 | 0.208 | 0.520 | 37.1 | 0.008 | 36.5 | 0.013 | Amorphous |
| Sample 44 | 0.124 | 0.205 | 0.671 | 36.1 | 0.008 | 35.5 | 0.013 | Amorphous |
| Sample 45 | 0.059 | 0.186 | 0.755 | 36.1 | 0.008 | 35.5 | 0.013 | Amorphous |
| Sample 46 | 0.912 | 0.087 | 0.001 | 39.9 | 0.008 | 39.2 | 0.014 | Amorphous |
| Sample 47 | 0.868 | 0.094 | 0.037 | 39.5 | 0.008 | 38.8 | 0.015 | Amorphous |
| Sample 48 | 0.790 | 0.114 | 0.096 | 38.3 | 0.008 | 37.7 | 0.014 | Amorphous |
| Sample 49 | 0.736 | 0.083 | 0.182 | 37.2 | 0.008 | 36.5 | 0.014 | Amorphous |
| Sample 50 | 0.634 | 0.096 | 0.270 | 35.9 | 0.009 | 35.2 | 0.014 | Amorphous |
| Sample 51 | 0.517 | 0.092 | 0.392 | 34.7 | 0.008 | 34.1 | 0.013 | Amorphous |
| Sample 52 | 0.407 | 0.092 | 0.501 | 34.0 | 0.009 | 33.3 | 0.014 | Amorphous |
| Sample 53 | 0.293 | 0.092 | 0.616 | 33.8 | 0.009 | 33.2 | 0.014 | Amorphous |
| Sample 54 | 0.178 | 0.096 | 0.727 | 32.6 | 0.009 | 32.0 | 0.013 | Amorphous |
| Sample 55 | 0.059 | 0.067 | 0.874 | 32.0 | 0.008 | 31.4 | 0.013 | Amorphous |
| Sample 56 | 0.976 | 0.022 | 0.002 | 37.9 | 0.008 | 37.3 | 0.013 | Amorphous |
| Sample 57 | 0.944 | 0.020 | 0.036 | 35.8 | 0.008 | 35.1 | 0.013 | Amorphous |
| Sample 58 | 0.884 | 0.026 | 0.090 | 35.8 | 0.009 | 35.1 | 0.014 | Amorphous |
| Sample 59 | 0.782 | 0.029 | 0.189 | 35.1 | 0.008 | 34.5 | 0.013 | Amorphous |
| Sample 60 | 0.696 | 0.030 | 0.275 | 34.1 | 0.008 | 33.5 | 0.012 | Amorphous |
| Sample 61 | 0.627 | 0.029 | 0.345 | 32.1 | 0.009 | 31.5 | 0.013 | Amorphous |
| Sample 62 | 0.521 | 0.030 | 0.450 | 32.2 | 0.009 | 31.6 | 0.014 | Amorphous |
| Sample 63 | 0.406 | 0.031 | 0.562 | 31.2 | 0.008 | 30.5 | 0.013 | Amorphous |
| Sample 64 | 0.283 | 0.033 | 0.684 | 30.0 | 0.008 | 29.4 | 0.013 | Amorphous |
| Sample 65 | 0.150 | 0.034 | 0.816 | 28.8 | 0.008 | 28.3 | 0.013 | Amorphous |
| Sample 66 | 0.000 | 0.000 | 1.000 | 27.8 | 0.008 | 27.3 | 0.012 | Amorphous |

INDUSTRIAL APPLICABILITY

The dielectric of the present disclosure can be suitably included in electronic components such as electrolytic capacitors.

What is claimed is:

1. A dielectric comprising a composite oxide including at least two selected from the group consisting of Nb, Bi, and Ta, wherein;
the following requirement (I), (II), or (III) is satisfied:
(I) the composite oxide includes Nb, Bi, and Ta;
(II) the composite oxide includes Nb and Bi and is amorphous; and
(III) the composite oxide includes Bi and Ta and is amorphous,
the composite oxide has composition represented by $Nb_xBi_yTa_{(1-x-y)}O_k$,
in the composition, k is a value for maintaining electroneutrality of the composite oxide, and
the composition satisfies the following requirement (i) or (ii):
(i) $x \geq 0.70$, $0 < y \leq 0.3$, and $0 < x+y < 1$; and
(ii) $x < 0.70$, $0.10 \leq y \leq 0.90$, and $0 < x+y < 1$.

2. The dielectric according to claim 1, wherein the dielectric is amorphous.

3. The dielectric according to claim 1, wherein the dielectric includes a sputtered film.

4. The dielectric according to claim 1, wherein the dielectric is for a capacitor.

5. A capacitor comprising:
a first electrode;
a second electrode; and
a dielectric disposed between the first electrode and the second electrode, wherein the dielectric is the dielectric according to claim 1.

6. The capacitor according to claim 5, wherein at least a portion of the first electrode is a porous portion.

7. The capacitor according to claim 5, wherein the first electrode includes a valve metal.

8. The capacitor according to claim 7, wherein the valve metal is at least one selected from the group consisting of Ta, Nb, and Bi.

9. The capacitor according to claim 5, wherein the second electrode includes at least one selected from the group consisting of Al, Ta, Nb, Bi, gold, silver, platinum, and nickel.

10. The capacitor according to claim 6, further comprising an electrolyte in contact with the second electrode, wherein
the electrolyte fills the porous portion and includes at least one selected from the group consisting of an electrolyte solution, an electrically conductive polymer, and manganese oxide.

11. An electrical circuit comprising the capacitor according to claim 5.

12. A circuit board comprising the capacitor according to claim 5.

13. An apparatus comprising the capacitor according to claim 5.

* * * * *